Aug. 19, 1924.
L. R. JONES
1,505,468
WINDSCREEN WIPER FOR MOTOR CARS AND THE LIKE
Filed Nov. 24, 1923
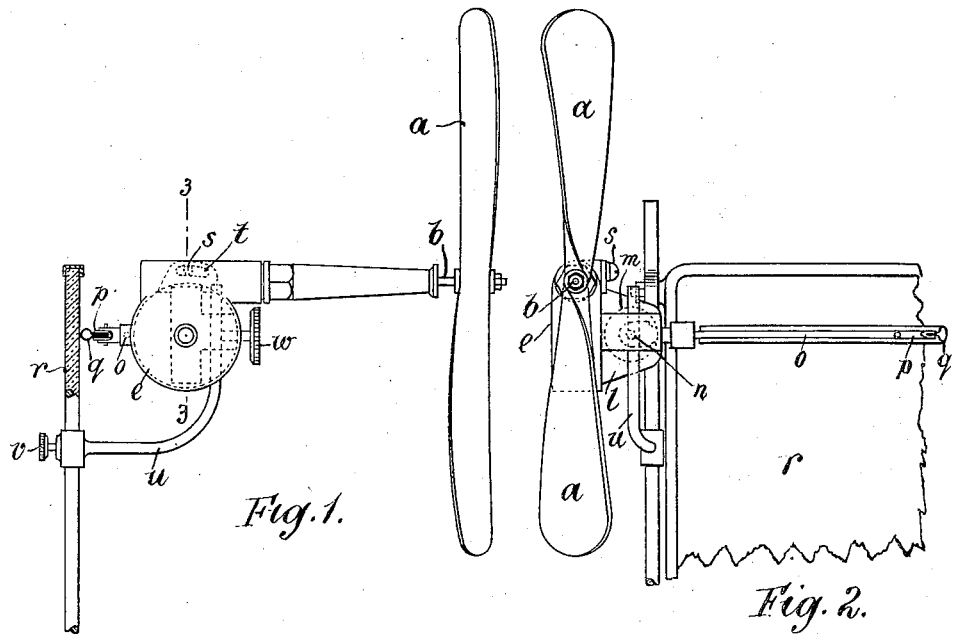
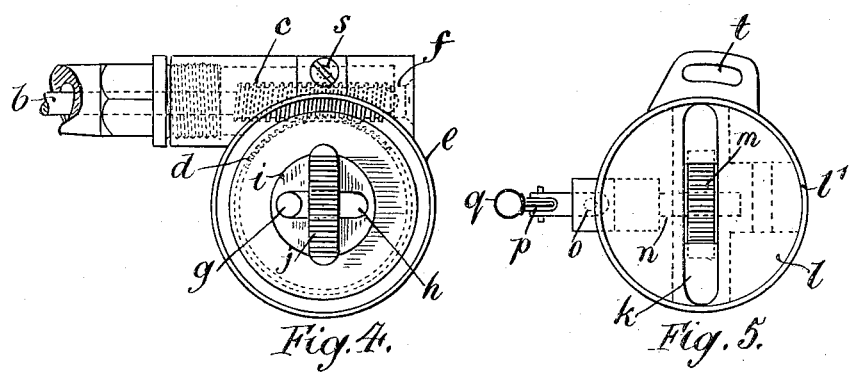
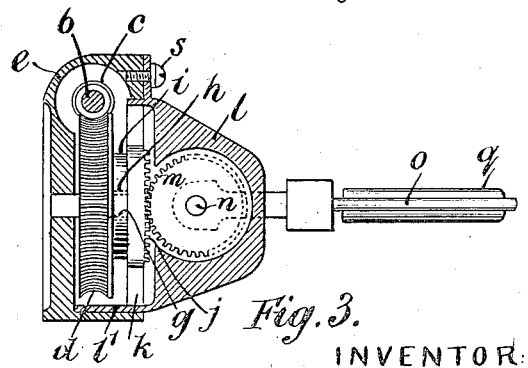
INVENTOR:
LEONARD REGINALD JONES
BY: Francis E. Boyce
ATTORNEY Patented Aug. 19, 1924.

1,505,468

UNITED STATES PATENT OFFICE.

LEONARD REGINALD JONES, OF LONDON, ENGLAND.

WINDSCREEN WIPER FOR MOTOR CARS AND THE LIKE.

Application filed November 24, 1923. Serial No. 676,695.

*To all whom it may concern:*

Be it known that LEONARD REGINALD JONES, subject of the King of Great Britain, residing at 32 Eldon Chambers, 30 Fleet Street, London, E. C. 4, England, has invented new and useful Improvements in Windscreen Wipers for Motor Cars and the like, of which the following is a specification.

This invention relates to wind screen wipers for motor cars and the like driven through worm or other reduction gearing by a wind vane rotated by the air pressure engendered by the forward progress of the vehicle.

The pivoted wind screen wiper, according to the present invention, is constructed and arranged to be oscillated by an eccentric device driven through reduction gearing by a wind vane.

For this purpose, the pivoted wiper is connected to a crank connected, through suitable reduction gearing, to the wind vane exposed to the air pressure, for example a two-bladed air propeller fast on a forwardly directed rotary spindle mounted at the side of the wind screen.

Air driven wind screen wipers with worm and wormwheel and spur wheel reduction gearing are illustrated on the accompanying drawing, in which:—

Fig. 1 is a side elevation partly in section, and

Fig. 2 a front elevation.

On a larger scale:

Fig. 3 is a section on the line 3—3 of Fig. 1.

Fig. 4 is a rear elevation with the bearing block for the wiper arm removed, and Fig. 5 is a front elevation of this block with the gear-enclosing casing in front thereof removed.

In the constructional embodiment of the invention illustrated, the reduction of speed is effected by worm and wormwheel gearing.

A two-bladed air propeller $a$ is fast on the spindle $b$ of a worm $c$. The worm $c$ is engaged with a wormwheel $d$, rotating in a casing $e$.

The inclination of the pitch of the propeller $a$ and the pitch of the worm $c$ are of such direction that the thrust of the spindle $b$ is rearward, and can therefore be taken by a thrust end bearing $f$ in the casing $e$, instead of requiring a thrust collar on the spindle $b$ in front of the worm $c$.

The wormwheel $d$ has a crank pin $g$ working in a transverse slot $h$ in a disk $i$, formed with a spur toothed rack $j$.

The rack $j$ is guided in an upright groove $k$ in a bearing block $l$, and is in engagement with a spur toothed sector $m$, fast on a spindle $n$ journalled in the block $l$.

A wiper arm $o$ is fast on an externally protruding end of the sector spindle $n$, and to its end is pivotally secured a bar $p$ of U-section in which is pinched the flange of a tubular beaded rubber strip $q$, which wipes the glass of the wind screen $r$.

The arm $o$ has a slight rearward rake to reach towards the wind screen $r$, and the bar $p$ with the strip $q$ is pivoted thereto so that the bar $p$ may be set parallel to the surface of the wind screen $r$.

The bearing block $l$ has a cylindrical shoulder portion $l^1$ which fits in a circular aperture in the casing $e$ concentrically with the wormwheel $d$, thus permitting angular adjustment of the worm and propeller spindle $b$ around the casing $e$. This adjustment is limited by a screw $s$ in the casing $e$ riding in a slotway $t$ in a flange of the block $l$, and is for the purpose of setting the spindle $b$ approximately horizontal notwithstanding the inclination or rake of the wind screen $r$.

The entire device is mounted on the wind screen $r$ by means of a bracket $u$, clamped by a screw $v$ to the border of the wind screen and supporting the block $l$ by passing through and being clamped by a screw $w$ in a hole in the block $l$.

The air pressure rotates the propeller $a$, spindle $b$ and worm $c$, which latter rotates the wormwheel $d$ at a vastly reduced speed. On rotation of the wormwheel $d$ its crank pin $g$ moves the rack $j$ up and down in the groove $k$, which causes the rack $j$ to displace the sector $m$ angularly in alternate directions, which oscillatory motion is precipitated in by the arm $o$, wiper bar $p$ and wiping strip $q$.

Claims:

1. In a wind screen wiper, an air vane, a worm rotated by said vane, a wormwheel rotated by said worm, a block carrying said wormwheel, means for attaching said block to a wind screen frame, a casing carrying said worm and vane angularly adjustable on said block, a crank pin on said wormwheel, and a wiper bar oscillated by said crank pin.

2. In a wind screen wiper, an air vane, a worm rotated by said vane, a wormwheel rotated by said worm, a block carrying said wormwheel, means for attaching said block to a wind screen frame, a casing carrying said worm and vane angularly adjustable on said block, a crank pin on said wormwheel, a transversely slotted disc engaged by said crank pin, a rack on said disc guided in a groove in said block, a toothed sector engaged with said rack, and a wiper bar connected to said toothed sector.

In testimony whereof I have signed my name to this specification.

LEONARD REGINALD JONES.